United States Patent

Matthews et al.

(10) Patent No.: US 8,332,627 B1
(45) Date of Patent: Dec. 11, 2012

(54) MUTUAL AUTHENTICATION

(75) Inventors: Brian L. Matthews, Kent, WA (US);
Cayce M. Ullman, San Jose, CA (US);
Schuyler Ullman, Sunnyvale, CA (US);
Scott Olechowski, Los Gatos, CA (US);
Ashish Warty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 891 days.

(21) Appl. No.: 11/672,941

(22) Filed: Feb. 8, 2007

Related U.S. Application Data

(60) Provisional application No. 60/771,688, filed on Feb. 8, 2006.

(51) Int. Cl.
*H04L 29/06* (2006.01)

(52) U.S. Cl. ............ 713/155; 713/182; 713/186; 726/8; 726/22

(58) Field of Classification Search .......... 713/182–184, 713/155, 186; 726/2–7, 8, 22
See application file for complete search history.

(56) References Cited

U.S. PATENT DOCUMENTS

| 6,677,933 | B1 * | 1/2004 | Yogaratnam ............ 345/174 |
| 6,934,743 | B2 * | 8/2005 | Huat .................. 709/218 |
| 7,058,817 | B1 * | 6/2006 | Ellmore ............... 713/183 |
| 7,146,009 | B2 * | 12/2006 | Andivahis et al. ....... 380/277 |
| 7,360,096 | B2 * | 4/2008 | Bracewell et al. ........ 713/183 |
| 7,631,346 | B2 * | 12/2009 | Hinton et al. ............ 726/8 |
| 7,685,631 | B1 * | 3/2010 | Paya et al. .............. 726/8 |
| 2001/0037451 | A1 * | 11/2001 | Bhagavatula et al. ..... 713/155 |
| 2002/0064149 | A1 * | 5/2002 | Elliott et al. ........... 370/352 |
| 2002/0188872 | A1 * | 12/2002 | Willeby ................ 713/202 |
| 2003/0037253 | A1 * | 2/2003 | Blank et al. ............ 713/200 |
| 2004/0060005 | A1 * | 3/2004 | Vasey .................. 715/513 |
| 2004/0117358 | A1 * | 6/2004 | von Kaenel et al. ....... 707/3 |
| 2005/0235210 | A1 * | 10/2005 | Peskin et al. ........... 715/716 |
| 2006/0286534 | A1 * | 12/2006 | Tillis et al. ............ 434/350 |
| 2007/0101196 | A1 * | 5/2007 | Rogers et al. ........... 714/38 |
| 2007/0143624 | A1 * | 6/2007 | Steeves ................ 713/182 |
| 2007/0185721 | A1 * | 8/2007 | Agassi et al. ............ 705/1 |

* cited by examiner

*Primary Examiner* — Jeffrey D Popham
*Assistant Examiner* — Gary Gracia
(74) *Attorney, Agent, or Firm* — Hickman Palermo Truong Becker Bingham Wong LLP

(57) ABSTRACT

Mutual authentication systems and methods are described that comprise an authenticating server that is available across a network and capable of authenticating a user based on credentials provided by the user. An embeddable object provided by the authenticating server and containing a passphrase that identifies the server to the user. A credentials entry mechanism identifies the user to the authenticating server. A user device displays an Outer Page that can request authentication. The authenticating server verifies the source of the request and provides the passphrase to the user device. The display of the passphrase confirms the identity of the authenticating server to the user. The source of the request can be verified using a secure cookie. The embeddable object can be provided in a second page and can prevent display of the passphrase if user input is not directed to the second page.

52 Claims, 3 Drawing Sheets

Web Browser Window

Web Browser Window

MUTUAL AUTHENTICATION

CROSS-REFERENCE TO RELATED APPLICATIONS

The present application claims benefit of priority from U.S. Provisional Patent Application Ser. No. 60/771,688 titled "Two-Way Authentication" and filed Feb. 8, 2006, the contents of which are incorporated herein by reference and for all purposes.

BACKGROUND OF THE INVENTION

1. Field of the Invention

The present invention relates generally to systems and methods for providing an embeddable mutual authentication mechanism and more particularly to systems and methods that address shortcomings of authentication mechanisms such as man-in-the-middle attacks and CSS overlay attacks and that can be used to implement a federated mutual authentication system across multiple sites and domains.

2. Description of Related Art

Many authentication systems, such as those used by secure websites, use a user's web browser as an input mechanism. Such systems face a challenge in that the client often cannot reliably determine whether an entity with which they are authenticating is a specific entity with which they intend to authenticate. Attackers are often able to trick users into entering their credentials into a website that looks like the intended entity with which they desire to authenticate. The attackers are thus able to capture a user's credentials and assume his identity when communicating with the intended entity. This type of attack is commonly called "phishing."

Phishing attacks generally rely on a user having the mistaken impression that he is providing his credentials to the intended entity when in reality the page belongs to an imposter. Because of this, the most effective way for an entity to fight phishing attacks is to provide the user with some form of verification that the authenticating entity is in fact who it claims to be. A system in which the server authenticates itself to the client in addition to the client authenticating itself to the server is known as a mutual authentication system.

One simple, low cost and low barrier method of providing mutual authentication is through the use of a passphrase. It is important to note the difference between a password and a passphrase in this context. In this document, 'password' is used to refer to a form of credentials that a user supplies to a server; 'passphrase' is used to refer to any piece of digital information that can be used to authenticate a server to a client. Common examples of a passphrase in this context would be text, an image, an audio or video clip, or a piece of HTML. A passphrase should be something that is meaningful to the user but cannot be easily guessed by an attacker.

A simple example application of a passphrase would be to identify valid emails from an organization. Organizations often warn clients that they will not send important information or requests for data in an email. To identify emails that are valid, an organization could include the user's passphrase in all correspondence. The inclusion of the passphrase lets the user know that the email must have come from the entity with which he established the passphrase. In practice, it is not desirable to email a passphrase because the overwhelming majority of email is sent unencrypted over the Internet. This makes it possible for an attacker to capture these passphrases during transmission. Stolen passphrases are very dangerous, because, if an attacker has a user's passphrase, he can use it to convince even an astute user that he is the entity that he is imitating.

A more realistic and common example application of a passphrase is a website that requires authentication, such as a bank's website. In this example, the bank displays the passphrase on the same bank webpage that requests the user's credentials. The presence of the passphrase assures the user that the authenticating entity is not a phisher since only the actual bank could know the user's passphrase.

Although the web browser example does not have the obvious drawbacks of the email example, it is not perfectly secure either. One common attack is known as a man-in-the-middle (MITM) attack. In a common MITM phishing attack, the phishing site simply acts as a relay for the communication between the user and the desired server. The user is actually sending all requests to the phisher, but, after capturing any desired data from the request, the phisher relays the request to the server and then relays the server's response to the user. The user is thus able to communicate normally with the server and there is no obvious cause for suspicion. In the passphrase example, even though the user is sending requests to the phisher and not the server, the passphrase is displayed so the user continues to supply the requested credentials.

Another failing of the website example is that it is possible for an attacker to embed the actual authentication page in another page which is controlled by the attacker. The attacker's outer page can theoretically include active content such as JavaScript that can attack the embedded authentication page or extract information from it. In practice, all significant web browsers address this issue by implementing what is known as cross-domain security. This prevents dynamic content served by one domain from accessing or manipulating content served by another domain. Since the phisher's outer page is not served by the same domain as the authentication page, the browser should prevent the phisher's page from accessing any information. There is, however, a hole in this browser security. Although an attacking page cannot directly interact with a page served by another domain, it can layer HTML elements on top of the embedded content using a technology such as Cascading Style Sheets (CSS). As a simple example, consider an authentication page that uses an HTML form field to request a password. An attacking page could embed the authentication page, and then overlay its own password field directly on top of the authentication page's password field. The user sees the passphrase and assumes that all is well, but the password field that is visible actually sends the password to the phisher!

In the previous website example, the page that requested credentials from the user was hosted on a web server. This example becomes slightly more complicated if the page is instead a local file that needs to authenticate with a server. Users are often advised that they can thwart phishing attacks by checking the address of the website they are visiting and verifying that the address matches the domain with which they are trying to authenticate. If the file is stored locally, then this check provides no additional security. One example of an application that uses this type of authentication is an application designed to send encrypted emails. A mechanism for doing this is to send an HTML email that contains both the encrypted data and a form asking for the password to allow the message to be decrypted. There is no simple way for the user to verify that the HTML will not capture the password that is entered in this form. Even if the email comes from a trusted entity, an attacker could intercept the email during transmission and modify the HTML. The HTML could contact the server to display a passphrase to assure the user that the request is valid, but if the HTML has been tampered with by an attacker then the modified HTML could easily capture the passphrase in addition to any credentials that are entered.

An additional potentially undesirable aspect of mutual authentication using a passphrase is that every organization must implement such a system and record the passphrases of its users. For the organizations, this requires additional storage infrastructure and the administration of a complex authentication scheme. For the users, remembering which passphrase is correct for each organization that uses such a scheme could be confusing. Moreover, if a user's passphrase is stolen from one organization it could be used in an attack on that user for a different organization.

BRIEF SUMMARY OF THE INVENTION

It is an object of the present invention to provide an embeddable mutual authentication mechanism that will allow a client to authenticate the server in addition to the server authenticating the client in order to thwart common phishing attacks. It is a further object of the present invention to provide an embeddable mutual authentication mechanism that is not susceptible to a MITM attack in which a phisher captures and tampers with data while relaying communication between a client and server. It is a further object of the present invention to provide an embeddable mutual authentication mechanism that is not susceptible to a CSS attack in which a phisher embeds the authentication page in an attacking page and uses the attacking page to overlay content in order to capture the authentication credentials. It is a further object of the present invention to provide an embeddable mutual authentication mechanism that can be used to securely authenticate with a server from within a local file, such as a file that was transmitted via email. It is a further object of the present invention to provide an embeddable mutual authentication mechanism that can be used to implement a federated mutual authentication system across multiple sites and domains.

The above objects are achieved by creating an embeddable object, such as a frame or iframe, that will perform the actual authentication and is served by the authenticating domain. Any page that a user visits will therefore consist of two main parts, hereafter referred to as the Inner Page and the Outer Page. The Inner Page is the embedded object that performs the actual authentication. It consists of the passphrase and any content needed to submit the authentication credentials.

When the user visits the Outer Page and tries to authenticate, the Outer Page will request the Inner Page from the authenticating server and the authentication will now be handled by the Inner Page. Before supplying any credentials, the user checks the passphrase to ensure that the Inner Page is authentic. If the user is satisfied that the Inner Page is authentic, he enters his credentials. The authenticating server receives the supplied credentials and determines whether or not the user is valid. If the server is satisfied that the user is valid then the user is now authenticated and the authenticating server indicates to the Outer Page that the user has been authenticated.

In certain embodiments the client sends a secure cookie along with a request. Since the browser will only send the cookie to the domain with which it is associated, if there is a phisher acting as a relay then the user's browser will not pass the cookie to the phisher, and the phisher will be unable to pass the cookie to the server. The server is thus able to distinguish requests coming from a relay from requests coming directly from the user.

Certain embodiments combat CSS based attacks that overlay content. In some embodiments, the Inner Page uses dynamic content such as JavaScript to control the display of the passphrase and ensure that the user is not using overlain controls. In some embodiments, the Inner Page to randomly change the location of the passphrase and other content each time the page is loaded. This hinders the ability of an attacker to create a credible overlay because the actual controls will be in a different spot every time, and the attacker has no way of knowing where to position the fake controls.

Certain embodiments are provided as a federated mutual authentication system across multiple sites and domains. All of the actual authentication can be performed by the combination of the Inner Page, which is served by the authenticating server, and the authenticating server itself. All of the complexity of the system is managed by the authenticating server. An organization can use the system by simply embedding the Inner Page in an existing site. Any number of organizations can thus employ the same mutual authentication system.

BRIEF DESCRIPTION OF THE DRAWINGS

The structural and functional aspects of the invention will become understood by those skilled in the art by reference to the following detailed description when taken in conjunction with the appended drawings, in which.

DETAILED DESCRIPTION OF THE INVENTION

Figure 1A:
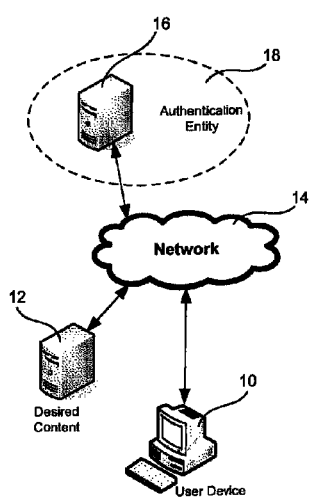
FIG. 1 illustrates a simple example of the invention that uses an embedded mutual authentication mechanism to authenticate using a password.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

In certain embodiments, an embeddable object, such as a frame or iframe, is created that will perform authentication and that can be served by an authenticating domain. Any page that a user visits can therefore consist of two main parts, hereinafter referred to as the "Inner Page" and the "Outer Page." The Inner Page can be an embedded object that performs the actual authentication. The embedded object can comprise a passphrase and any content needed to submit the authentication credentials. In one example, one or more HTML form fields may be provided to input the credentials and an HTML form submit button may be included to submit the credentials. The Outer Page is typically the page that a user is ultimately attempting to access and/or use. In one example, the Outer Page may be a bank webpage. The Outer Page can comprise any appropriate content because this content is unrelated to the authentication mechanism. For example, the Outer Page can include explanatory text related to the security systems and links to other services provided by the bank. In some embodiments, the Inner Page and Outer Page can be served by different domains, although there is no necessity to so divide Page service.

In certain embodiments, when the user visits the Outer Page and tries to authenticate, the Outer Page may request the Inner Page from the authenticating server and the authentication can now be handled by the Inner Page. Before supplying any credentials, the user typically checks the passphrase to ensure that the Inner Page is authentic. If the user is satisfied that the Inner Page is authentic, the user can provide his credentials. The authenticating server then receives the credentials and validates the user. If the server is satisfied that the user is valid then the user can be authenticated and the authenticating server indicates to the Outer Page that the user has been authenticated.

In certain embodiments, when a phisher is able to relay communications from the user to the server and thereby capture the passphrase, susceptibility to MITM attacks may remain. Accordingly, in certain embodiments the authenticating server must only return the passphrase if it is satisfied that the requester is a valid user rather than an impostor or a relay. The server typically cannot ask for a password to check the validity of the user since such request may require the user to supply credentials before being assured that the server was valid and the system would not be a mutual authentication system. Therefore, certain embodiments require the client to provide some other form of identification. For example, the client may be requested to transmit a secure cookie along with the request. Since the browser will only send the cookie to the domain with which it is associated, the browser will not pass the cookie to a phisher acting as a relay. When the phisher fails to relay the cookie to the server, authentication will fail. Thus, the server can distinguish requests coming from a relay from requests coming directly from the user.

In one example, a server requires that the user authenticate before allowing access to certain resources. The user in turn requires that the server authenticate itself by showing a passphrase. The server, however, requires the user to identify himself before returning the passphrase so that the passphrase cannot be stolen. A cookie is one of the simplest pieces of information that the user can share with the server initially to prove that there is no man-in-the-middle relaying communication.

Certain embodiments provide methods to avoid CSS based attacks that overlay content on an Inner Page that is designed to be embedded in an Outer Page. In one example, the Inner Page uses dynamic content such as JavaScript to control the display of the passphrase and ensure that the user is not using overlain controls. Where an Inner Page has an HTML form field for the user's password, an attacking page can easily put a field on top of this field. According to certain aspects of the present invention, the Inner Page can include JavaScript to prevent display of the passphrase unless the Inner Page has the keyboard focus. Thus, if the control on the attacking page has keyboard focus, then the passphrase will not be shown. In some embodiments, the Inner Page can display a dynamic warning message when it does not have the focus. In another example, the Inner Page can randomly change the location of the passphrase and other content each time the page is loaded. These random changes can hinder the ability of an attacker to create a credible overlay because the actual controls can be in a different location on each occasion that the Inner Page is displayed, and it will be difficult for the attacker to ascertain where fake controls should be placed.

In certain embodiments, the Inner Page is embedded and served by the authenticating domain, and it is of little importance whether or not the Outer Page is a local file. Even if the Outer Page is a local file that was transmitted via email and an attacker was able to insert malicious active content, the local file does not have access to content served by the authenticating domain. The browser's cross-domain security prevents the local file from accessing or manipulating any of the content in the Inner Page.

Embodiments of the invention can be used to implement a federated mutual authentication system across multiple sites and domains. All of the actual authentication can be performed by the combination of the Inner Page, which is served by the authenticating server, and the authenticating server itself. All of the complexity of the system can be managed by the authenticating server. An organization can use the system by simply embedding the Inner Page in an existing site. Any number of organizations can thus employ the same mutual authentication system.

Figure 1B:
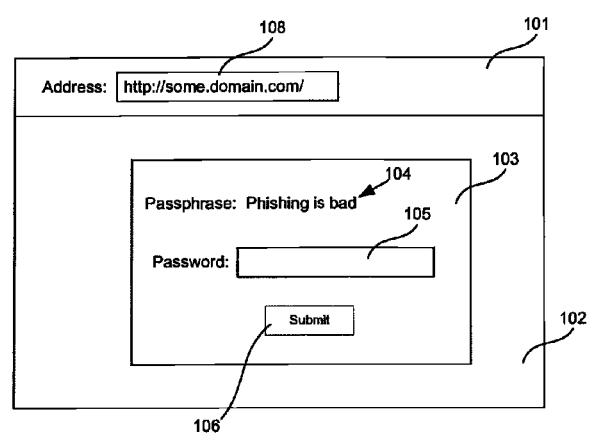

FIGS. 1A and 1B illustrate an example of one embodiment of the invention which uses a web browser or other computer program 101 capable of displaying HTML when running on a user's machine 10. In the example, the user may attempt to access a resource addressable at a URL 108, in this example: "some.domain.com." Typically, the URL 1086 can be reached using a network such as the World Wide Web 14. A server 12 reached at some.domain.com may require or request user authentication before allowing access to the user. To authenticate the user, the server 12 may direct the user to an authentication page ("Outer Page") 102. In certain embodiments, the Outer Page 102 can also be hosted by server 12. Outer Page 102 may not directly solicit credentials from the user itself but typically it can embed a separate "Inner Page" 103 to handle certain of the authentication details. Inner Page 103 can be served by an authenticating server 16 provided by an authenticating entity 18. In certain embodiments, the server 12 and authenticating server 16 are not part of the same domain. In some embodiments, the server 12 and authenticating server 16 can be part of the same domain.

In certain embodiments, the Inner Page 103 is assigned responsibility for obtaining authentication details on behalf of or under direction of the authentication entity 18. In order to provide mutual authentication, the Inner Page 103 must typically prove to the user that it belongs to the authentication entity 18. In certain embodiments, the Inner Page 103 displays a passphrase 104 associated with the user. This passphrase 104 can prove to the user that the Inner Page 103 necessarily belongs to the authentication entity 18 and is not provided by a phisher because only the user and the authentication entity 18 know the user's passphrase 104. If the passphrase 104 is not provided by the Inner Page 103, or if an incorrect passphrase 104 is presented, the user can be alerted and warned not to enter credentials or private, sensitive or secure information.

When the passphrase 104 is correctly displayed by the Inner Page 103, the user can confidently enter a password in a password field 105 and/or provide another form of credentials before selecting a submit button 106 or otherwise initiating submission of credentials to the authenticating entity 18. The authenticating server 16 may then receive the credentials, validate them, and notify the Outer Page 102 of the result of the authentication attempt. Typically, the Inner Page 103 can not communicate the authentication result directly to the Outer Page 102, and notification generally requires that the authenticating server 16 notify the server 12 that hosts the Outer Page 102. The server 12 may then take an appropriate action based on the authentication result. Actions taken by the server 12 may be predetermined by combinations of a system, a service provider, the user and the authenticating entity 18.

Figure 2A:
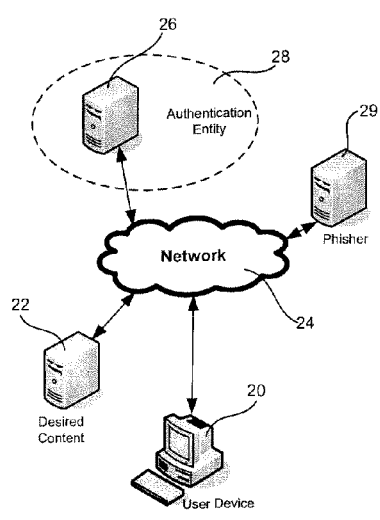
FIG. 2 illustrates a CSS overlay attack and the method used by the invention to thwart such an attack.
Figure 2B:
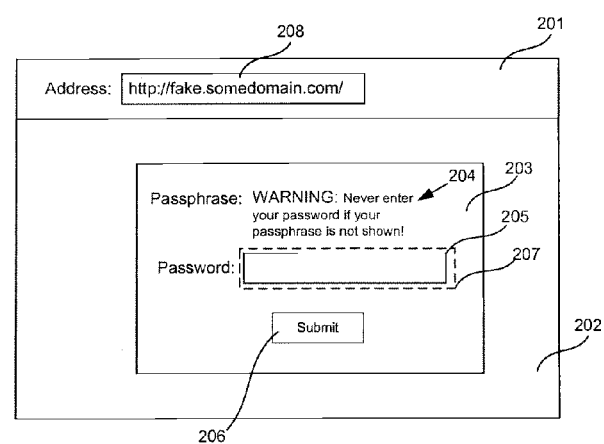

FIGS. 2A and 2B illustrate another example of an embodiment of the invention which uses a web browser or other computer program 201 capable of displaying HTML or other displayable content when running on a user's computing device 20. In the example, a user desires and/or attempts to access a resource located at "some.domain.com." However, the user is instead in communication with a phisher server 29 located at a URL 208, in this example: "fake.somedomain.com." Phisher server 29 at fake.somedomain.com is configured to adopt certain characteristics of, and to imitate the behavior of some.domain.com in order to misappropriate the user's credentials. An Outer Page 202 provided by phisher server 29 and displayed to the user may have a similar or identical appearance to a genuine Outer Page 102 (see FIG. 1B) provided by some.domain.com that the user expects to see.

In the example, the attacker is aware that the some.domain.com targeted by the user provided according to certain aspects of the invention and that a mutual authentication system is used by some.domain.com. Consequently, the attacker may not expect to acquire the user's password directly because a typical user would not submit a password without seeing a correct passphrase displayed in the browser 201. Therefore, the Outer Page 202 provided by phisher server 29 embeds an actual authentication page (Inner Page) 203 that would normally handle all of the authentication details for an authentication entity 28. Inner Page 203 is typically served by the authenticating server 26. In certain embodiments, the Inner Page 203 does not object to a request for embedding received Outer Page 202, because such requests are not necessarily prohibited and can originate from many sources.

In order to provide mutual authentication, the Inner Page 203 must prove to the user that it belongs to a valid authentication entity 28. Accordingly, the Inner Page 203 may display the user's passphrase 204. This passphrase 204 proves to the user that the Inner Page 203 must belong to the authentication entity 28 and is not obtained from a phisher, i.e. obtained from phisher server 29. In normal operation, only the user and the authentication entity 28 know the user's passphrase. It will be appreciated that even though an attempted phishing attack by the Outer Page 202 provided by phisher server 29 is in progress in the example, the Inner Page 203 genuinely belongs to the authentication entity 28 and will typically present a valid passphrase 104 (see FIG. 1B). A valid passphrase may be presented even when special precautions against MITM attacks have been implemented by the Authenticating Server 26, because the attack in the example is not an MITM attack.

Although the Inner Page 203 is valid, the Mimic Outer Page 202 does not have access to any data of the Inner Page 203 while the user is in the Inner Page 203. Therefore a phisher may attempt to obtain credentials through additional measures. In the example, it will be assumed that the correct passphrase 104 is displayed to the user. Accordingly, the user will typically enter his credentials in the password field 205 and submit them to the Authenticating Server 26 using the submit button 206. However, the attacker may attempt to interfere with the process in order to misappropriate the credentials even though the Outer Page 202 does not have access to information provided in the Timer Page 203, including the password field 205, due to cross-domain security measures of the web browser 201. Consequently, the attacker may attempt to capture credentials using CSS-based attack methods.

Certain embodiments include systems and methods to combat CSS-based attacks. In the example, the attacker's Outer Page 202 may be configured to use CSS to position elements on top of or otherwise overlay the Timer Page 203. In certain embodiments of the invention, the Authenticating Server 26 is configured to adopt certain preemptive counter measures such as randomly changing the position of the password field 205 inside the Inner Page 203. Even so, the attacker may be able to perfectly position a field 207 over the password field 205 that is controlled by the Outer Page 202 such that the user is able to see the correct passphrase 104, in which case the user may enter a password. In the latter example, the password would likely be entered in the only visible password field 207, which is a field controlled by the Outer Page 202 and the Outer Page 202 may be able to capture the password and successfully phish the user.

Certain embodiments of the invention provide an Timer Page 203 that can alert a user of potential attack and warn against entering any data in the overlain field 207. In some embodiments, the Inner Page 203 can alert and warn users through the use of active content such as JavaScript. For example, JavaScript can be used to detect when elements on the Timer Page 203 have gained or lost keyboard focus. The Inner Page 203 can keep track of such events and can withhold display of the passphrase 104 until it is certain that the Timer Page 203 has keyboard focus and, thus, will receive any input typed by the user. When the Inner Page 203 detects that it has lost keyboard focus, it may replace the passphrase 104 with a warning message 204 that informs the user of what is happening. User credentials will typically be entered only when the correct passphrase 104 is shown and, if the keyboard focus is redirected to the attacker's password field 207, then the Timer Page 203 can remove the passphrase 104, and the typical user will not supply the password to the attacker.

Figure 3:
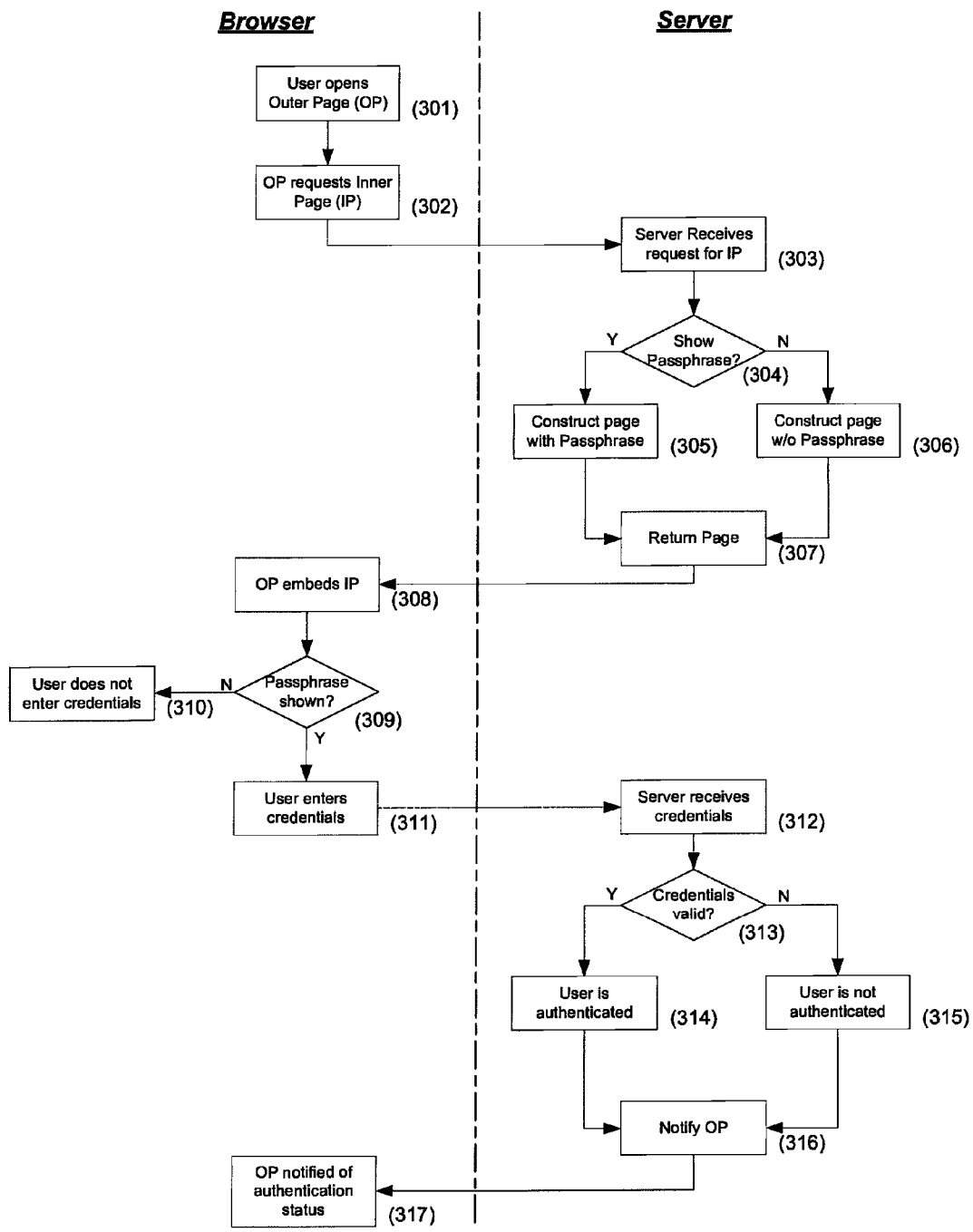
FIG. 3 illustrates the complete process of using the invention for secure mutual authentication.

FIG. 3 illustrates an example of a process for using the present invention for secure mutual authentication. At step 301, a user navigates to or otherwise opens an Outer Page in a web browser. Instead of managing the authentication itself, the Outer Page is configured to delegate this responsibility to an Inner Page, and, at step 302 the Outer Page requests the Inner Page from an authenticating server.

At step 303, the authenticating server receives the request for the Inner Page and determines at step 304 whether or not to provide the user's passphrase as part of the Inner Page. In making such determination, the authenticating server may evaluate information associated with the request from the Outer Page such as origin of the request and a history of such requests from the source, and information associated with the user including, for example, identifying information, status, user history and preferences and so on. The server will typically generate an Inner Page with a valid passphrase at step 305 if it is convinced that the user is valid and the request is not made as part of a phishing attack, including an MITM attack. In certain embodiments, the information used in the decision can be based on the presence or absence of a secure cookie. A valid user will typically have previously established a cookie that is tied to the domain of the authenticating server.

In certain embodiments, the user may have been pre-registered by the authenticating entity in order to create a passphrase, password, to create a secure cookie tied to the authentication domain and to provide other information. If the user is being phished using a MITM attack then the user's browser will typically not send the secure cookie to the attacker and the attacker will have no way of forwarding the cookie to the authenticating server. If the server determines that the passphrase should not be sent, then at step 306 an incomplete Inner Page, a special Inner Page with an alert or warning or no Inner Page may be prepared. At step 307, a response is transmitted to the requesting Outer Page.

At step 308, the browser receives the response from the authenticating server and embeds the Inner Page in the Outer Page. The response is typically displayed to the user or a message can be provided. The user will typically review the displayed response at step 309 to determine if a valid passphrase is displayed. If no such passphrase is provided, the user will typically withhold credential information at step 310 and may attempt authentication again. A user may also suspect that a phishing attack is in progress and can refrain from entering credentials or take other appropriate action.

As described above, the Inner Page itself may also withhold display of the passphrase using, for example, active content such as JavaScript. If the Inner Page detects that the Outer Page is using a CSS overlay attack then the passphrase will not be shown even though the server included the passphrase in the Inner Page.

At step 311, the user can supply his credentials to the authenticating server when the displayed Inner Page provides a valid passphrase. The user typically assesses the displayed information to authenticate the server providing the Outer Page based on the validity of the Inner Page received from an authenticating entity. At step 312, the authenticating server receives the credentials submitted by the user and determines whether or not the credentials are valid at step 313. In certain embodiments, credentials can be validated using information associated with the user that can be provided by a database, a service or other means. Typically, a database may include a copy of the password for comparison with the password submitted to the Inner Page. The present invention, however, is not limited to this approach for storing, accessing, and comparing credentials. If the user is authenticated, then at step 314 an appropriate response and/or message may be prepared for the requesting Outer Page and certain predetermined actions may be taken including for example, execution of login procedures. If the user is not authenticated, then at step 315, a notification can be prepared for the Outer Page and certain appropriate actions taken, including updating histories, logs, generating alerts, etc.

At step 316 the server may notify the Outer Page of the result and provide any alerts or messages as desired. Notification typically includes sending one or more messages to the server that hosts the Outer Page indicating the authentication status because the authenticating server and Inner Page typically cannot communicate directly with the Outer Page. At step 317, the Outer Page or the server hosting the Outer Page receives notification of the authentication status and the Outer Page may then take appropriate actions based on the status of the authentication.

Additional Descriptions of Certain Aspects of the Invention

Certain embodiments of the invention provide systems and methods for providing an embeddable mutual authentication mechanism. These systems and methods can comprise an authenticating server that is available across a network and capable of authenticating a user based on credentials provided by the user, an embeddable object (Inner Page) served by the authenticating server and containing a passphrase that identifies the server to the user and a credentials entry mechanism that can supply the credentials necessary to identify the user to the authenticating server, an Outer Page that can contain any content in addition to the embedded Inner Page and that will be notified by the authenticating server when the user has finished authenticating. In certain embodiments, the passphrase can be text or any other piece of digital content such as an image or audio or video clip that is meaningful to the user but that cannot be easily guessed by an attacker. In certain embodiments, the credentials can be a password or a combination of passwords. In certain embodiments, the network can be the Internet. In certain embodiments, the embeddable object is embedded in an HTML document as a frame or iframe. In certain embodiments, the credentials entry mechanism can be provided as an HTML form with a password field and a submit button. In certain embodiments, the Outer Page can be hosted by a server whose domain may or may not be the same as that of the authenticating server. In certain embodiments, the Outer Page can be retrieved from locally accessible storage such as a directly or LAN connected storage device. In certain embodiments, the Outer Page is initially provided to the user via email. In certain embodiments, the authenticating server may require some form of identification from the user before displaying the passphrase in the Inner Page so as to thwart possible man-in-the-middle attacks. In certain embodiments, the form of identification can be a secure cookie on the user's computing device that is tied to the authenticating server's domain and, typically, will always be transmitted with requests to the authenticating server but not transmitted with requests to an impostor site acting as a relay. In certain embodiments, the authenticating server randomly changes the relative position of the passphrase and credentials entry controls on the Inner Page every time the Inner Page is returned so as to reduce the ability of an attacker to overlay fake controls. In certain embodiments, the Inner Page using active content such as JavaScript to only display the passphrase when the Inner Page has the keyboard focus and will receive any data inputted by the user, thus hindering the effectiveness of an overlay attack.

In certain embodiments, the mutual authentication system may be used to authenticate an encrypted email sent in an HTML payload that was sent to the user via email according to claim 9. In certain embodiments, the mutual authentication system may be used to implement a federated mutual authentication system across multiple sites and domains. In certain embodiments, the mutual authentication system may be used as a front end for the exchange of Security Assertions or SAML tokens. In certain embodiments, the mutual authentication system may be used as a front end to another federated identity system. In certain embodiments, the federated identity system can be the Liberty Alliance and the mutual authentication system can operate as an Identity Provider.

Certain embodiments of the invention provide a method of mutual authentication comprising receiving a request from a first page displayed on a user device, presenting a secured object on the user device, wherein the secured object is secured with respect to the first page and includes a passphrase known by a user, obtaining credentials of the user in response to the presenting and validating the credentials. In certain embodiments, the passphrase is maintained by an authenticating entity. In certain embodiments, the secured object page is obtained from the authenticating entity and presented in a second page. In certain embodiments, the step of validating is performed by the authenticating entity. In certain embodiments, the step of receiving a request includes verifying a secure cookie provided by the user device and associated with the authenticating entity. In certain embodiments, the user and the passphrase are pre-registered with the authenticating entity. In certain embodiments, a copy of the credentials is maintained by the authenticating entity. In certain embodiments, the credentials include a password. In certain embodiments, the first and second pages are displayed in a browser. In certain embodiments, the second page includes active content and the step of presenting the secured object includes configuring the browser to direct user input of the credentials to the second page, and displaying the passphrase only while the user input is directed to the second page. In certain embodiments, the passphrase is displayed at a randomly selected location in the browser. In certain embodiments, the step of configuring the browser includes providing the second page with keyboard focus. In certain embodiments, the first page is provided to the user device from a website. In certain embodiments, the first page is provided to the user device by locally accessible storage. In certain embodiments, the first page is provided to the user device by Email and, in some embodiments, the Email is encrypted.

Certain embodiments of the invention provide a mutual authentication system comprising a passphrase associated with a user, a computing device adapted to display web pages in a browser, and an authentication server configured to validate credentials of the user, wherein the credentials are submitted by the user upon display of the passphrase in a secured object embedded in a page displayed by the browser, and display of the passphrase authenticates the authentication server to the user. In certain embodiments, the authentication server and the passphrase are maintained by an authenticating entity. In certain embodiments, the credentials include a password. In certain embodiments, the secured object is provided in response to an authenticated request and further comprising a secure cookie wherein the secure cookie authenticates the request to the authentication server. In certain embodiments, the authentication server provides authentication for the exchange of SAML tokens. In certain embodiments, the authentication server provides authentication for a federated mutual authentication system comprising a plurality of domains and geographically distinct sites. In certain embodiments, the mutual authentication system is the Liberty Alliance.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method of mutual authentication between an authentication server and a user comprising the steps of:
    an authentication server verifying a source of a request received at the authentication server from a first page displayed in a user device;
    responsive to the verified request, the authentication server presenting a secured object to a second page in the user device, wherein the secured object is secured with respect to the second page and includes a passphrase, known by a user, and a credentials input text field, wherein the second page is different from the first page, wherein the passphrase is displayed on the second page only when the second page has a keyboard focus, and wherein the credentials input text field, but not the passphrase, is displayed when the second page does not have the keyboard focus;
    wherein the presenting the passphrase to the user allows the user to authenticate the authentication server and allows the user to supply credentials of the user if the user successfully authenticates the authentication server from the passphrase;
    the authentication server not obtaining the credentials of the user if an authentication of the authentication server by the user failed;
    the authentication server obtaining the credentials of the user in response to a successful authentication of the authentication server by the user from the passphrase; and
    the authentication server validating the credentials;
    wherein the method is performed by one or more processors.

2. The method of claim 1, wherein the passphrase is maintained by an authenticating entity and the authentication server is provided by the authentication entity.

3. The method of claim 1, wherein the step of validating is performed by the authentication server.

4. The method of claim 3, wherein the step of verifying the source includes verifying a secure cookie provided by the user device and associated with the authenticating entity.

5. The method of claim 3, wherein the user and the passphrase are pre-registered with the authenticating entity.

6. The method of claim 3, wherein a copy of the credentials is maintained by the authenticating entity.

7. The method of claim 3 wherein the first page is provided to the user device by Email.

8. The method of claim 7 wherein the Email is encrypted.

9. The method of claim 1, wherein the credentials include a password.

10. The method of claim 1, wherein the first and second pages are displayed in a browser.

11. The method of claim 10, wherein the second page includes active content and the step of presenting the secured object includes configuring the browser to direct user input of the credentials to the second page.

12. The method of claim 11, wherein the passphrase is displayed at a randomly selected location in the browser.

13. The method of claim 11, wherein the step of configuring the browser includes providing the second page with the keyboard focus.

14. The method of claim 1 wherein the first page is provided to the user device from a web site.

15. The method of claim 1 wherein the first page is provided to the user device by Email.

16. The method of claim 1 wherein the first page is provided to the user device by locally accessible storage.

17. The method of claim 1, wherein a warning phrase is displayed on the second page when the second page does not have the keyboard focus.

18. The method of claim 1, wherein an alarm phrase is displayed on the second page to alert the user of a potential security-breach attack.

19. An apparatus, comprising:
    one or more processors;
    a non-transitory computer-readable storage medium storing one or more sequences of instructions which, when executed by the one or more processors, cause the one or more processors to perform:
        verifying a source of a request received at the authentication server from a first page displayed in a user device;
        responsive to the verified request, the authentication server presenting a secured object to a second page in the user device, wherein the secured object is secured with respect to the second page and includes a passphrase, known by a user, and a credentials input text field, wherein the second page is different from the first page, wherein the passphrase is displayed on the second page only when the second page has a keyboard focus, and wherein the credentials input text field, but not the passphrase, is displayed when the second page does not have the keyboard focus;

wherein the presenting the passphrase to the user allows the user to authenticate the authentication server and allows the user to supply credentials of the user if the user successfully authenticates the authentication server from the passphrase;

obtaining the credentials of the user in response to a successful authentication of the authentication server by the user from the passphrase.

20. The apparatus of claim 19, wherein the passphrase is maintained by an authenticating entity and the authentication server is provided by the authentication entity.

21. The apparatus of claim 20, wherein the user and the passphrase are pre-registered with the authenticating entity.

22. The apparatus of claim 20, wherein a copy of the credentials is maintained by the authenticating entity.

23. The apparatus of claim 19, wherein the non-transitory computer-readable storage medium further comprises instructions which, when executed by the one or more processors, cause the one or more processors to perform: verifying a secure cookie provided by the user device and associated with the authenticating entity.

24. The apparatus of claim 19, wherein the credentials include a password.

25. The apparatus of claim 19, wherein the first and second pages are displayed in a browser.

26. The apparatus of claim 19, wherein the second page includes active content; wherein the non-transitory computer-readable storage medium further comprises instructions which, when executed by the one or more processors, cause the one or more processors to perform: configuring the browser to direct user input of the credentials to the second page.

27. The apparatus of claim 19, wherein the passphrase is displayed at a randomly selected location in the browser.

28. The apparatus of claim 19, wherein the non-transitory computer-readable storage medium further comprises instructions which, when executed by the one or more processors, cause the one or more processors to perform: providing the second page with the keyboard focus.

29. The apparatus of claim 19, wherein the first page is provided to the user device from a website.

30. The apparatus of claim 19, wherein the first page is provided to the user device by Email.

31. The apparatus of claim 19, wherein the first page is provided to the user device by locally accessible storage.

32. The apparatus of claim 19, wherein the first page is provided to the user device by Email.

33. The apparatus of claim 32, wherein the Email is encrypted.

34. The apparatus of claim 19, wherein a warning phrase is displayed on the second page when the second page does not have the keyboard focus.

35. The apparatus of claim 19, wherein an alarm phrase is displayed on the second page to alert the user of a potential security-breach attack.

36. A non-transitory computer-readable storage medium storing one or more sequences of instructions which, when executed by one or more processors, cause the one or more processors to perform:

verifying a source of a request received at the authentication server from a first page displayed in a user device;

responsive to the verified request, the authentication server presenting a secured object to a second page in the user device, wherein the secured object is secured with respect to the second page and includes a passphrase, known by a user, and a credentials input text field, wherein the second page is different from the first page, wherein the passphrase is displayed on the second page only when the second page has a keyboard focus, and wherein the credentials input text field, but not the passphrase, is displayed when the second page does not have the keyboard focus;

wherein the presenting the passphrase to the user allows the user to authenticate the authentication server and allows the user to supply credentials of the user if the user successfully authenticates the authentication server from the passphrase;

obtaining the credentials of the user in response to a successful authentication of the authentication server by the user from the passphrase.

37. The computer-readable storage medium of claim 36, wherein the passphrase is maintained by an authenticating entity and the authentication server is provided by the authentication entity.

38. The computer-readable storage medium of claim 36, further comprising instructions which, when executed by the one or more processors, cause the one or more processors to perform verifying a secure cookie provided by the user device and associated with the authenticating entity.

39. The computer-readable storage medium of claim 36, wherein the user and the passphrase are pre-registered with the authenticating entity.

40. The computer-readable storage medium of claim 36, wherein a copy of the credentials is maintained by the authenticating entity.

41. The computer-readable storage medium of claim 36, wherein the credentials include a password.

42. The computer-readable storage medium of claim 36, wherein the first and second pages are displayed in a browser; wherein the second page includes active content.

43. The computer-readable storage medium of claim 36, further comprising instructions which, when executed by the one or more processors, cause the one or more processors to perform configuring the browser to direct user input of the credentials to the second page.

44. The computer-readable storage medium of claim 36, wherein the passphrase is displayed at a randomly selected location in the browser.

45. The computer-readable storage medium of claim 36, further comprising instructions which, when executed by the one or more processors, cause the one or more processors to perform providing the second page with the keyboard focus.

46. The computer-readable storage medium of claim 36, wherein the first page is provided to the user device from a website.

47. The computer-readable storage medium of claim 36, wherein the first page is provided to the user device by Email.

48. The computer-readable storage medium of claim 36, wherein the first page is provided to the user device by locally accessible storage.

49. The computer-readable storage medium of claim 36, wherein the first page is provided to the user device by Email.

50. The computer-readable storage medium of claim 36, wherein the Email is encrypted.

51. The computer-readable storage medium of claim 36, wherein a warning phrase is displayed on the second page when the second page does not have the keyboard focus.

52. The computer-readable storage medium of claim 36, wherein an alarm phrase is displayed on the second page to alert the user of a potential security-breach attack.

* * * * *